Patented May 30, 1939

2,160,719

UNITED STATES PATENT OFFICE 2,160,719

PREGNANOLONES AND METHODS FOR PRODUCING THE SAME FROM PREGNANDIOLS

Adolf Butenandt, Danzig-Langfuhr, Free City of Danzig, assignor to Schering Aktiengesellschaft, a corporation of Germany No Drawing. Application December 24, 1934, Serial No. 759,115. In Germany December 23, 1933

12 Claims. (Cl. 260—397)

(Granted under the provisions of sec. 14, act of March 2, 1927; 357 O. G. 5)

This invention relates to organic compounds and more particularly to pregnanolones and their esters and methods for producing the same.

It has for its object the production of pregnanolones from pregnandiols.

For this purpose one may proceed as follows:

In the first place, one of the hydroxyl groups of the pregnandiol is protected against the subsequent oxidation by being esterified, such conditions being employed that only one hydroxygroup is esterified, whereupon this half-ester is oxidized to the ester of the corresponding monoketone which is finally saponified.

Or the pregnandiol may first be oxidized to pregnandion and converted into pregnanolon by partial reduction whereby the reduction is carried out in such a manner, that only one keto group is reduced to an alcohol group.

The first phase of this latter method, the oxidation of the pregnandiol to pregnandion, has already been carried out and described by Butenandt (Berichte der deutschen chem. Gesellschaft, vol. 63, p. 662–63) were also the complete reduction of pregnandion to pregnan by means of concentrated hydrochloric acid and zinc amalgam while heating, is described (l. c. vol. 64, page 2536). The partial reduction of pregnandion to pregnanolon, however, was successful for the first time by the process claimed herein. The partial reduction can not only be carried out by means of catalytically or otherwise activated hydrogen but also by treatment of the pregnandion in the absence of catalysing agents with compounds that are capable of yielding hydrogen while at the same time forming their corresponding oxidation products, such as tetralin, cyclohexanol etc.

A further method of producing pregnanolon from pregnandiol or allo-pregnanolon from allo-pregnandiol consists in first converting the pregnandiol into a di-ester, saponifying said di-ester into the mono-ester by the action of a very weak alkaline liquid in the cold, oxidizing said mono-ester to a keto-ester and producing the keto alcohol pregnanolon therefrom by saponification.

The pregnanolones represent valuable intermediate products for the production of compounds of therapeutic value, such as the hormone of the male germinal gland.

The following examples serve to illustrate the present invention without, however, limiting the same to them:

Example 1

To a solution of pregnandiol in pyridin there are added 1.2 equivalents of acetic acid anhydride. The solution is left standing for a few days at room temperature. By pouring the solution into diluted sulphuric acid the pregnandiol monoacetate separates in crystal form. It is dissolved in petroleum ether whereby small quantities of unesterified pregnandiol remain undissolved, the petroleum ether is evaporated and the residue is purified by crystallisation from alcohol.

The pregnandiol monoacetate thus produced is dissolved in glacial acetic acid and mixed with a quantity of chromic acid corresponding to 1.5 atoms of oxygen. The solution is allowed to stand for one day at room temperature, the glacial acetic acid is then evaporated until crystallisation begins, whereupon the acetate of the hydroxyketone is precipitated by the addition of water. This compound has most probably the following structural formula:

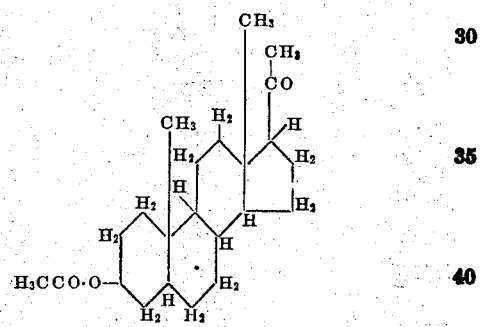

The crude acetate is saponified, without further purification, to the free hydroxyketone by boiling for one hour with 3% alcoholic potassium hydroxide solution. The crude pregnanolon thus produced can be further purified by recrystallisation, for instance from alcohol. The yield amounts to 40–60%, calculated on pregnandiol.

The structural formula of the product is most probably as follows:

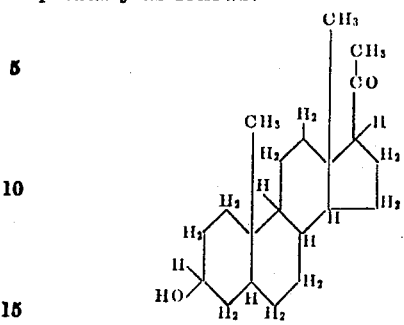

Example 2

1 g. of pregnandiol is oxidised according to Butenandt in 40 ccm. of 90% glacial acetic acid solution with an equal weight of chromic acid anhydride in 40 ccm. of glacial acetic acid in the cold whereby the pregnandion of the melting point 123° C. is obtained.

0.5 g. of said pregnandion is treated, according to Willstaetter's method, in 100 ccm. of glacial acetic acid in the cold with platinum and hydrogen until a quantity of hydrogen is absorbed necessary for the reduction of one carbonyl group. The reduction product, chiefly pregnanolon $C_{21}H_{34}O_2$, has, after recrystallisation from alcohol, a melting point of 142° C.

Example 3

A solution of pregnandiol diacetate saturated in the cold is made in methylalcohol (about 3 g. of acetate in 1 liter of alcohol), this is mixed with 0.8 mol of methylalcoholic potassium hydroxide solution, the reaction solution is then allowed to stand about 30 hours at room temperature, neutralised with diluted hydrochloric acid and freed in vacuum to a great extent from the solvent. The reaction product is precipitated by the addition of water, filtered off or dissolved with ether, the ether solution is dried and evaporated. The residue is extracted in the warm with petroleum ether (boiling point 70–80° C.) which leaves most of the resultant pregnandiol undissolved. The petroleum ether solution, filtered hot, precipitates a further small quantity of pregnandiol in flakeform which is also filtered off; the solution is subsequently evaporated to dryness whereupon the residue is recrystallised from alcohol and then from diluted acetone up to a constant melting point of 170.5° C. (uncorrected). The pregnandiol-(20)-mono-acetate produced crystallises in well-formed small needles.

4.2 g. of the pregnandiol-(20)-mono-acetate thus produced are kept in 240 ccm. of glacial acetic acid with a suitable quantity of chromium-trioxide corresponding to 1.1 equivalent of oxygen, for one day at room temperature. The solution is highly concentrated by evaporation in vacuum and the reaction product is precipitated by the addition of water. Thereby the acetate of pregnanolon-(3) is produced in the form of long needles from alcohol, having a melting point of 142–142.5° C. (uncorrected).

3.9 g. of pregnanolon acetate are heated with 300 ccm. of 2.8% alcoholic potassium hydroxide solution for one hour at boiling point. After neutralising with diluted hydrochloric acid the reaction solution is concentrated in vacuum, freed from the precipitated potassium chloride and mixed with water. The precipitated pregnanolon-20(3) is recrystallised from alcohol and acetone. Large prisms are formed having a melting point of 152° C. (uncorrected). Its semicarbazon melts at 203–204° C. (uncorrected). The yield amounts to 40–60%.

In place of the acetic acid anhydride other acylating agents such as benzoylchloride, salicylic acid chloride, phthalic acid anhydride and the like may be used.

For the saponification of the di-ester to the mono-ester alkali hydroxide solutions of other concentration than given in the example may be used and the temperature and duration may be varied according to the properties of the various di-esters. Likewise the separation of the mono-ester from the pregnandiol can be carried out in other ways, for instance, by oxidation or by crystallisation and the like.

The oxidation can also be carried out by means of other oxidizing agents than chromic acid such as potassium permanganate and the like and under other reaction conditions.

Likewise, the partial reduction of the pregnandion in Example 2 may be carried out by means of hydrogen in the presence of other catalysts or even with hydrogen in statu nascendi or with atomic hydrogen.

As starting material there may be used not only the pregnandiol as it is isolated as by-product in the production of follicle hormone from urine but also other pregnandiols obtained synthetically.

Thus, for instance, allo-pregnandiol may be converted into allo-pregnanolon by the same procedure as described in the examples.

Of course, the given examples serve merely to illustrate the invention; various other modifications and changes in the processes and reagents may be made by those skilled in the art in accordance with the principles set forth herein and in the claims annexed hereto.

What I claim, is:

1. In a method for the production of pregnanolon compounds, the steps which comprise subjecting a pregnandiol to a treatment whereby one hydroxy group is substituted by a group which on hydrolysis is reconvertible into a hydroxy group, and oxidizing the free secondary alcohol group to the keto group.

2. In a method for the production of pregnanolon compounds, the steps which comprise subjecting a pregnandiol to an esterification reaction which is limited and controlled so as to replace only one of the OH groups with an acyl group, and then oxidizing the free secondary alcohol group to the keto group.

3. A method for the production of a pregnanolon compound of the general formula $C_{21}H_{34}O_2$, comprising subjecting a pregnandiol to a partial esterifying treatment to form the mono-ester of said pregnandiol, oxidizing the free secondary alcohol group to the keto group and saponifying the pregnanolon ester obtained.

4. A method for the production of a pregnanolon compound of the general formula $C_{21}H_{34}O_2$, comprising subjecting a pregnandiol to an esterifying treatment to form the di-ester of said pregnandiol, partially saponifying said di-ester whereby the mono-ester of said pregnandiol is obtained, oxidizing the free secondary alcohol group to the keto group, and saponifying the pregnanolon ester obtained.

5. In a method for the production of pregnanolon compounds, the steps which comprise subjecting a pregnandiol to an esterifying treatment to form the di-ester of said pregnandiol, partially saponifying said di-ester, whereby the mono-ester of said pregnandiol is obtained, and oxidizing the free secondary alcohol group to the keto group.

6. A saturated cyclopentano polyhydro phenanthrene compound of the general formula $C_{21}H_{33}OX$ where X is a member of the group consisting of the hydroxyl group and groups which on hydrolysis are convertible into an hydroxy group and having the following structural formula

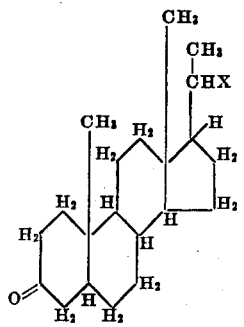

7. A saturated cyclopentano polyhydro phenanthrene compound of the general formula $C_{21}H_{34}O_2$ and having the following structural formula

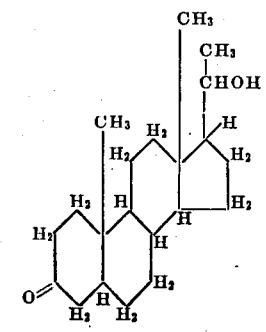

8. A saturated cyclopentano polyhydro phenanthrene compound of the general formula $C_{21}H_{33}OX$ where X is an O-acyl group and having the following structural formula

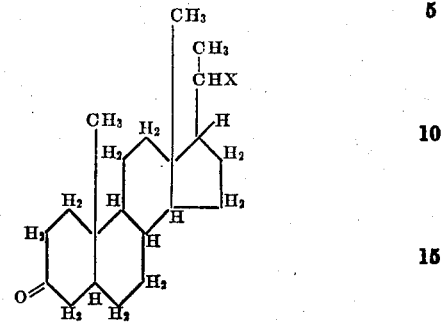

9. A saturated keto-cyclopentano polyhydro phenanthrene compound of the general formula $C_{21}H_{33}OX$ where X is a member of the group consisting of the hydroxyl group and groups which on hydroylsis are convertible into an hydroxy group, the keto group being in one of the 3 and 20 positions and X in the other of such positions.

10. A saturated hydroxy - keto - cyclopentano polyhydro phenanthrene compound of the general formula $C_{21}H_{34}O_2$, the hydroxy group being in one of the 3 and 20 positions and the keto group in the other of such positions.

11. A saturated keto-cyclopentano polyhydro phenanthrene compound of the general formula $C_{21}H_{33}OX$ wherein X is an O-acyl group, the keto group being in one of the 3 and 20-positions and X in the other of such positions.

12. In a method for the production of pregnanolon compounds, the step which comprises oxidizing a monoester of pregnandiol with an agent capable of converting the free secondary hydroxy group into a keto group.

ADOLF BUTENANDT.